Oct. 3, 1961
J. H. BREMS
3,002,604
ENDLESS CHAIN SYSTEM
Filed Oct. 28, 1957
2 Sheets-Sheet 1
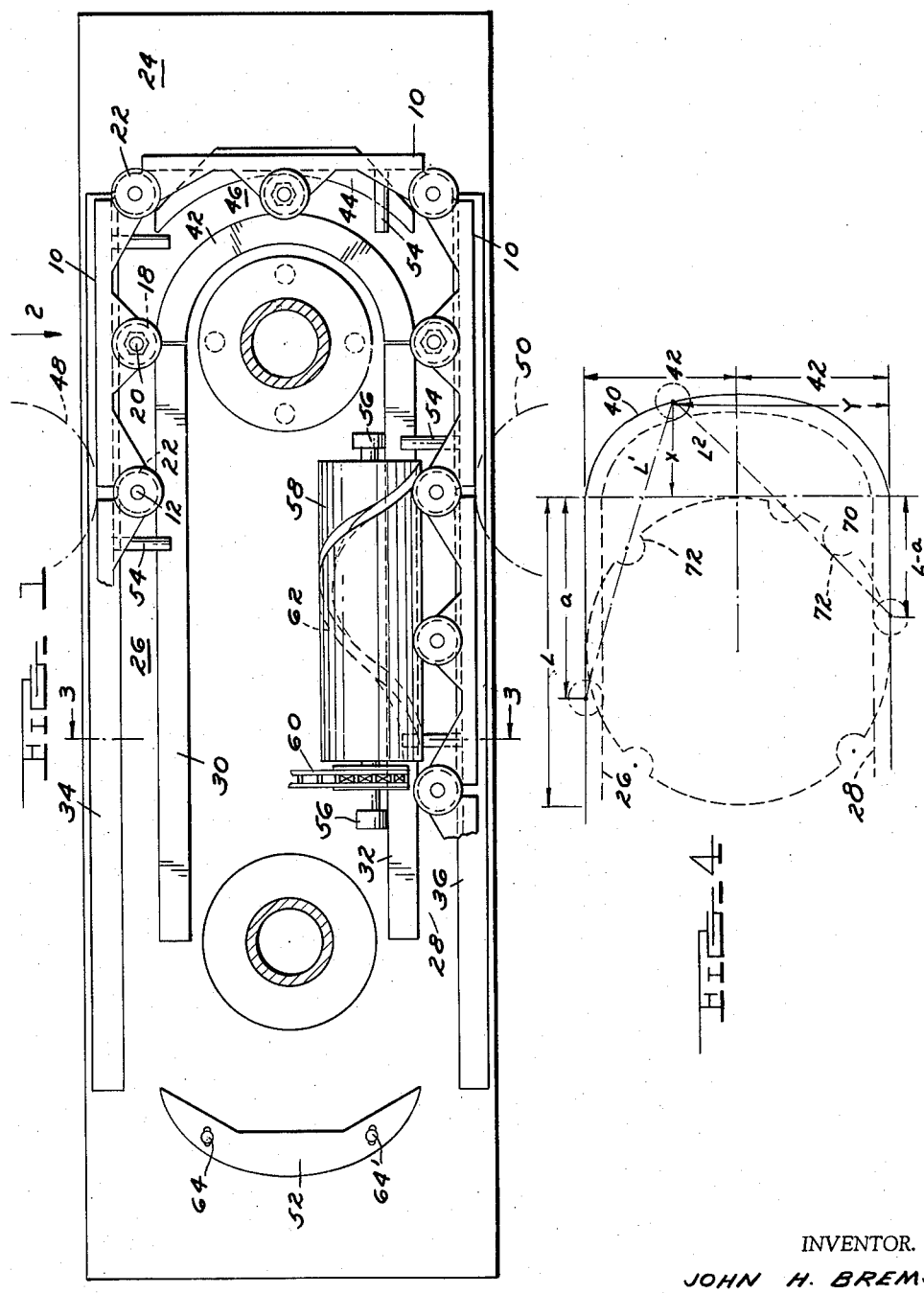
INVENTOR.
JOHN H. BREMS
BY
Barnes, Kisselle, Raisch & Choate
ATTORNEYS

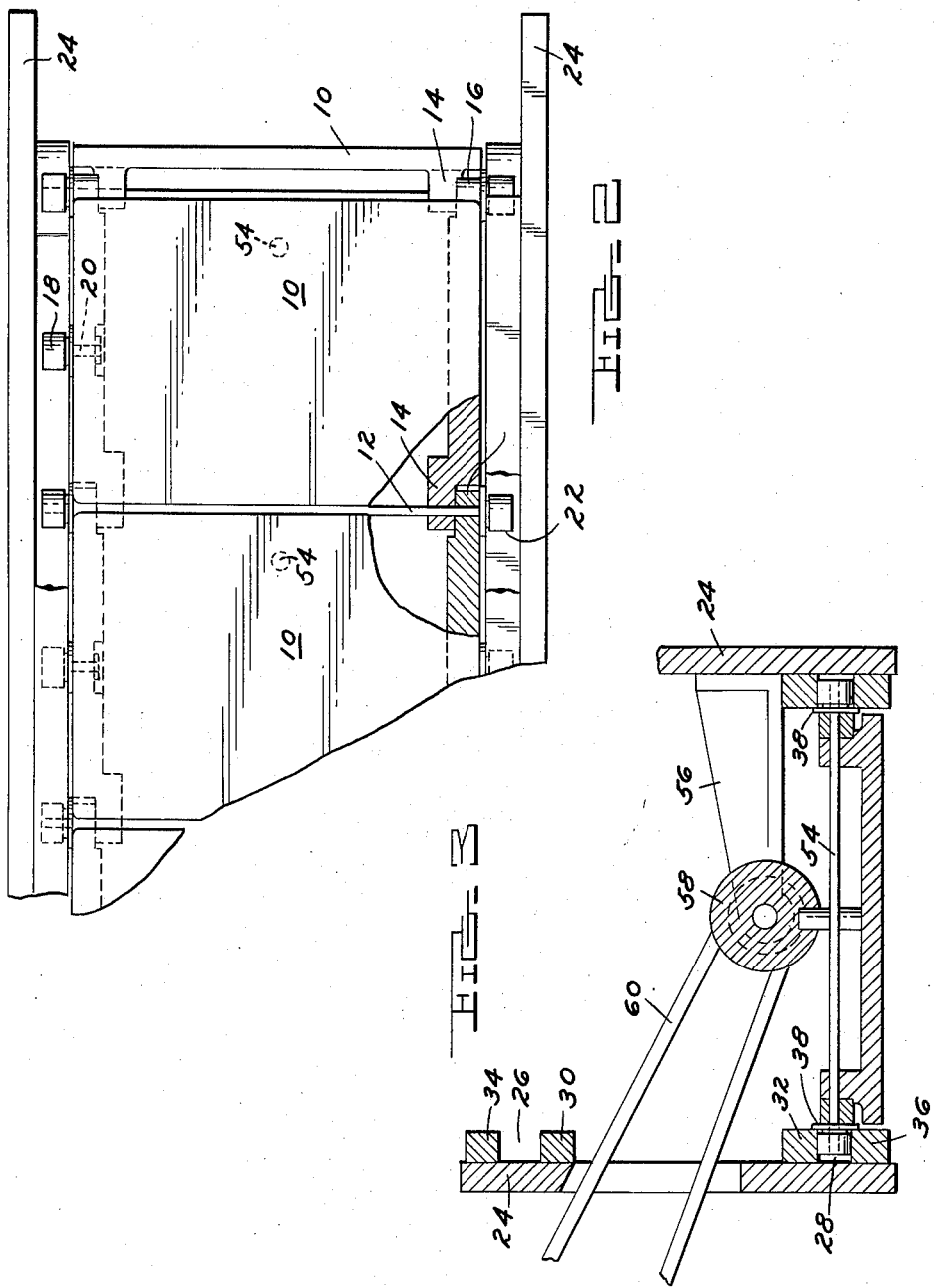

United States Patent Office 3,002,604
Patented Oct. 3, 1961

3,002,604
ENDLESS CHAIN SYSTEM
John H. Brems, Detroit, Mich., assignor to Motomation, Inc., Detroit, Mich., a corporation of Michigan
Filed Oct. 28, 1957, Ser. No. 692,760
15 Claims. (Cl. 198—137)

This invention relates to endless chain systems such as may be used for conveyors, for vehicular traction devices, or for transmission of power. Where articles are to be transported as, for example, along factory production lines, or where a vehicle is to lay down an endless track for its own support, it has been customary to provide an endless chain consisting of links which usually comprise load bearing pads or pallets of suitable shape to form a substantially continuous load bearing platform. The chain is usually guided along an outgoing and a returning path by rollers, tracks or similar arrangements and at the ends of the load bearing track runs turn-around means are provided in the form of idler or driving sprockets. In systems of this character, the sprockets serve to pull the chain out of one run and feed it into another, and they may also serve to provide the point of power input or take-off to or from the chain system.

Where a sprocket is used as the turn-around device in an endless chain system, the kinematics of the system involve a non-uniformity in the displacement velocity of individual links as they enter and leave the straight runs. This is due to the finite length of the links, which produces a polygonal rather than a circular contour of the chain around the sprocket. If these non-uniform displacements are to be minimized, the links must be kept short and the sprockets made large. Also, the pivot point of each link as it enters and leaves a sprocket notch should be kept as close to the end of the link as possible.

Where the chain links are themselves constructed to serve as pallets, platforms or article carriers, it is usually necessary that the link be of considerable length. Thus the pallets partake of considerable non-uniform motion as the links enter and leave the straight runs. This is serious because of the resulting slackness which must be introduced into the chain system. It also seriously limits the maximum speeds which may be attained without vibration.

The use of an independent string of pallets which are not coupled together and are guided along a suitable track, likewise has not proved satisfactory for high speed smooth operation of pallets of considerable length.

According to the present invention, an endless chain system may be provided in which links of substantial length in relation to the turn-around diameter may be used while maintaining uniform displacements of the links entering and leaving the straight runs of the chain loop. This may be done by dispensing with sprockets as turn-around mediums and by providing curved track portions along which the links may be guided and which are mathematically co-ordinated with the link characteristics so as to produce a turn-around motion which has uniform increments of exit, and entry into, the straight runs.

By providing turn-arounds of this character, an endless chain system may be maintained free of slack which is not possible with the sprocket turn-around because of the non-uniform velocity of links leaving and entering the sprocket. It may also be operated at higher speeds and with much less vibration even with design proportions which are practically unachievable with conventional chain systems.

It is accordingly an object of the present invention to provide an endless chain system, wherein links of substantial length may be turned around at the ends of the longitudinal runs with uniform motion of the links leaving and entering the runs.

A further object is to provide a system of this character in which the turn-around is accomplished with a minimum spacing between the straight runs; namely, that equivalent to the length of a single link of the chain.

Another object of the present invention is to provide an improved driving means for an endless chain system in which a driving engagement with the chain may be obtained without the use of sprockets.

Further objects and advantages of the present invention will be apparent from the following description, reference being had to the accompanying drawing wherein a preferred form of the present invention is illustrated.

In the drawing:

FIG. 1 is a side view partly in section of an endless chain conveyor incorporating a preferred form of the present invention.

FIG. 2 is a top view partly in section of the conveyor shown in FIG. 1.

FIG. 3 is a cross section on line 3—3 of FIG. 1.

FIG. 4 is a diagram illustrating the conditions during turn-around.

The endless chain system of the present invention may comprise a series of pallet links which are essentially rectangular load bearing platforms indicated generally at 10. These platforms are pivoted to each other at their ends by pivot rods 12 which pass through overlapping ears 14 and 16 formed at the four corners of each respective link or pallet. It will be understood that this particular conformation of pallet or link is merely representative of any of the well-known forms which such elements may take.

Mid-way of the pivot rods 12, there is provided on each link a track follower which may take the form of a roller 18 pivoted to the link upon an axle 20. Track followers are also provided at each of the pivots 12 and may comprise rollers 22. The track followers 18 and 22 are duplicated at opposite sides of the each link 10.

Secured to upstanding frame plates 24 on each side of the chain, there is provided a track system which constitutes the sole guiding and supporting means for the chain. That is to say, there are no sprockets which guide or support the chain. This track system which is duplicated at the two sides of the chain comprises a pair of linear track runs 26 and 28 which are formed by bars 30 and 32 respectively. These form straight runs for the rollers 18 and 22 as will be clearly seen in FIG. 3. Bars 34 and 36 prevent outward movement of the rollers. Suitable thrust washers 38 may be provided upon the pivot rods 12 and the axles 20 to position the chain laterally.

The determination of the proper path through which the link pivots should be led during turn-around in accordance with the present invention is obtained by mathematical considerations which are illustrated in FIG. 4. In order to achieve uniformity of entry and exit velocity at the ends of the straight runs 26 and 28, a curve indicated at 40 has been derived such that a link pivot traversing that curve will produce a motion of the opposite pivot which exits from and enters into the straight runs 26 and 28 with equal instantaneous velocities. That is to say, if the distance L represents the length of one link and the distance "$a$" represents any given distance from the end of the straight run to a pivot which is about to leave the run, then the distance L−$a$, shown at the bottom of FIG. 4, will be the amount which the entering pivot is entered into the straight run 28 at the same instant for all values of "$a$." If the runs 26 and 28 are spaced by the distance L which is the minimum spacing possible, then the curve 40 may be derived as a plot of X and Y coordinates which are determined by the following formula:

$$x = \frac{\sqrt{L^2 - \left(\frac{L}{2}+y\right)^2} + \sqrt{L^2 - \left(\frac{L}{2}-y\right)^2} - L}{2}$$

Where the track followers at the pivots are guided along the curve 40, the mid-link track followers 18 will traverse a path which is defined by the formula:

$$x^2 + y^2 = \left(\frac{L}{2}\right)^2$$

This latter formula is the plot of a circle.

In accordance with the present invention, the track for the endless chain system is provided with turn-arounds at each end which are curved to produce the motions defined in the preceding formulas. In FIG. 1 the device is shown with circular track engaging the mid-link track followers 18 at the right hand end of the system and with an elliptical track engaging the pivot track followers at the left end. Thus, the track bar 42 and the curved plate 44 define between them a curved track 46 within which the mid-link track followers 18 may run in a true circular path connecting the straight runs 26 and 28.

The curved bar 44 has its ends spaced from the bars 34 and 36 so as to allow for passage of the pivot track followers 22, in a straight line out of and into the straight runs. Thus, the pivot track followers 32 may swing outwardly of the circular track 46, passing on the outside of the track bar 44 and again re-entering the straight run.

The bars 34 and 36 include portions adjacent the ends which perform the function of holding the links 10 in line until the mid-link track follower 18 starts into the curved turn-around, the purpose being to hold the pivot track follower 22, which is riding on the bars 30 and 32, in contact with the same. That is to say, the link is prevented from pivoting about roller 18 while one end roller 22 is projecting "in the air" beyond the end of a straight run. This may be accomplished by other means such as a roller indicated in dotted lines at 48 and 50 bearing upon the flat surfaces of the links 10.

At the left hand end of the chain system, there is shown a turn-around comprising an elliptical cam track 52 which engages the pivot track followers 22. The track 52 is provided with a contour which is termed elliptical herein to indicate a contour generally similar to the mathematical curve 40 and derived upon corresponding principles. The track 52 is spaced from the ends of the straight runs 26 and 28 so as to allow passage of the mid-link track followers 18 so they may swing inwardly of the track 52.

It will be understood, of course, that the chain system of the present invention may use either type of turn-around at one or both ends. Should elliptical tracks be utilized at both ends, the mid-link followers may be omitted. In order to insure continuity of turn-around motion when elliptical tracks are used at both ends, it is necessary to use an odd number of chain links, but when this is done, the turn-around tracks 52 may be an extension of the straight run rails 30 and 32. Likewise, with either an odd or an even number of links the circular turn-around tracks 42 may be used at both ends.

For the purpose of providing a power drive to the chain, it is most convenient to apply the drive at a point in one of the straight runs. Any suitable means which will inter-engage with the links successively and pull them along is suitable, such as an ordinary sprocket wheel engaging one or both of the straight chain runs. It is preferred, however, to utilize a cylinder cam drive which engages individual upstanding drive pins 54 formed on each link 10.

One or more of such drives may be arranged at suitable points along either or both of the straight runs, and in the embodiment illustrated a single such drive is mounted on a suitable stationary pair of brackets 56, FIG. 3, secured to the side frame of a member 24. Pivoted on these brackets is a rotary drum 58 which may be driven by a suitable drive such as the chain 60. The drum 58 has a generally helical groove 62 formed in its surface and through which the pins 54 must pass as the links travel lengthwise of the drum. The pitch of the groove 62 may be uniform if constant velocity of the chain is desired or, if special intermittent or non-uniform motion is wanted, the curvature of the groove 62 may be formed to produce the desired motion.

In operation, when the drum 58 is rotated by input power through the chain 60, the successive drive pins 54 enter the slot 62 and are propelled or cammed along from one end to the other of the drum 58 as it rotates. The chain links follow along the outgoing and returning straight runs with their positions maintained in each straight run by the rollers 18 and 22 which are engaged with the tracks 30 and 32. As each link in turn comes to the end of the straight run, it is held in line with the following links by the outer rail 34 or 36 or by the rollers 48 or 50 until the mid-link roller 18 starts onto the curved track 42 at the right hand end in FIG. 1, or until the lead pivot roller 22 reaches the beginning of the elliptical contour of the turn-around track 52. Thereafter, the link is turned around with a deceleration of its mid point until, when it reaches the vertical position, shown at the right hand end of FIG. 1, the mid point of the link is stationary for a theoretical instant. At this same instant, the end points are moving horizontally and oppositely at full chain velocity. Thereafter, the mid point is again accelerated until the link has been brought into line with the straight run whereupon it has reached full chain velocity.

The chain may be maintained in a taut condition by suitable adjusting means such as the longitudinal mounting slots and bolts 64. The degree to which non-uniformity of motion of the central portion of a link occurs during turn-around can readily be seen from FIG. 4, wherein a sprocket is indicated at 70 having four equally spaced notches 72. With the mid point of link L' in a notch 72, the mid point of link $L^2$ is located considerably short of the next notch 72. Thus, the deceleration of the roller 18 during the first quarter circle of turn-around brings the roller to a dead stop as the turn-around is half completed. Thereafter, acceleration occurs.

It is apparent that the present invention provides an endless chain system which may be maintained completely taut at all times. It is not necessary with the system of the present invention, in contrast to conventional systems, that the chain have intentional slackness therein for the purpose of taking up the non-uniformity in velocity of the links which enter and leave the straight runs. In addition, the motion of the chain is uniform and lacks the vibratory action produced by sprockets or other conventional turn-around means.

While the form of embodiment of the invention as herein disclosed constitutes a preferred form, it is to be understood that other forms might be adopted, all coming within the scope of the claims which follow.

What is claimed is as follows:

1. A sprocket-less, endless, precision transfer system to move in a continuous, accurately defined circuit comprising a plurality of load-bearing platforms articulated at points adjacent their ends upon parallel pivot axes, a track follower on each platform rotatably secured thereto on an axis parallel to and co-planar with the first pivot axes and midway therebetween, a track for said track followers having linear runs along which the platforms are guided for movement in opposite directions, said linear runs being parallel and spaced apart the lateral distance between said pivot axes of each load-bearing platform, and a stationary, circular track section between adjacent ends of the linear track runs for guiding the track followers between said linear runs and serving as a pivot area to facilitate the transmittal of driving force on said platforms from one linear run to the other, the section being curved about an axis parallel to the pivot axes to effect transfer of each platform out of one run and into the other with equal instantaneous velocities without slack in the joints between the platforms, and a drive means to transmit a driving force on said platforms along one of said linear runs.

2. A device as defined in claim 1 in which track followers are provided at each pivot axis to run also in said linear track runs, said curved track section permitting the passage of said midway track-followers along one path of the curved section and permitting the passage of said track followers at the pivot axes outside the curved section.

3. A device as defined in claim 1 in which the track followers are in pairs, each follower of a pair being symmetrically positioned on opposed sides of the platforms, and the tracks are double, spaced tracks to register with said spaced followers of said pairs.

4. A sprocket-less, endless, precision transfer system to move in a continuous, accurately defined circuit comprising a plurality of load-bearing platforms articulated at joints adjacent their ends upon parallel pivot axes, a load-supporting track follower on each platform rotatably secured thereto on an axis parallel to and co-planar with the first pivot axes and midway therebetween, a track for said track followers having linear runs parallel to the plane of said platforms along which the platforms are guided for movement in opposite directions, said linear runs being parallel and spaced apart the lateral distance between said pivot axes of each load-bearing platform, and a stationary, circular track section between adjacent ends of the linear track runs for guiding the track followers between said linear runs and serving to facilitate the transmittal of driving force on said platforms from one linear run to the other, the section being curved about an axis parallel to the pivot axes to effect transfer of each platform out of one run and into the other with equal instantaneous velocities without slack in the joints between the platforms, and a drive means to transmit a driving force on said platforms along one of said linear runs.

5. A sprocket-less, endless, precision transfer system to move in a continuous, accurately defined circuit comprising a plurality of load-bearing platforms articulated at joints adjacent their ends upon parallel pivot axes, a track follower on each platform rotatably secured thereto on an axis parallel to and co-planar with the first pivot axes, a track for said track followers having linear runs along which the platforms are guided for movement in opposite directions, said linear runs being parallel and spaced apart the lateral distance between said pivot axes of each load-bearing platform, and a stationary, curved track section between adjacent ends of the linear track runs for guiding the platforms between said linear runs and serving as a pivot area to facilitate the transmittal of driving force on said platforms from one linear run to the other, the section being curved about an axis parallel to the pivot axes to effect transfer of each platform out of one run and into the other with equal instantaneous velocities without slack in the joints between the platforms, and a drive means to transmit a driving force on said platforms along one of said linear runs.

6. A sprocket-less, endless precision transfer system to move in a continuous, accurately defined circuit comprising a plurality of load-bearing platforms articulated at joints adjacent the ends upon parallel pivot axes, a track follower at each joint at the ends of said platforms with an axis common to said joints and rotatably secured to the platforms, a track for said track followers having linear runs along which the platforms are guided for movement in opposite directions, said linear runs being parallel and spaced apart in increments of the lateral distance between said pivot axes of each load-bearing platform, a stationary track section between adjacent ends of the linear track runs for guiding the track followers between said linear runs and serving as a pivot area to facilitate the transmittal of driving force on said platforms from one linear run to the other, the section being curved about an axes parallel to the pivot axis in a path to effect equal and opposite linear displacement of the pivot axes of said platforms along the respective linear runs without slack in the joints between the platforms, and a drive means to transmit a driving force on said platforms along at least one of said linear runs.

7. A sprocket-less, endless, precision transfer system including a drive means for contacting successive elements thereof comprising a plurality of load-bearing pallets pivoted together on parallel axes, track followers secured to the pallets having axes co-planar with the pallet axes, and a track constituting the sole supporting and guiding means for the pallets and comprising a plurality of linear runs with bends positioned therebetween at the ends, said bends being curved to guide the followers with a substantially identical instantaneous exit and entry velocity at the ends of the linear runs for all positions of a pallet whereby the pallets may be maintained taut without variation in effective span as individual pallets enter and leave the linear runs.

8. A sprocket-less, endless, precision transfer system including a drive means for contacting successive elements thereof comprising a plurality of pallets pivoted together on parallel axes, track followers secured to the pallets having axes co-planar with the pallet axes, and a track constituting the sole supporting and guiding means for the pallets and comprising a plurality of linear runs with bends positioned therebetween at the ends, at least one of said bends being a semi-ellipsoidal curve to guide the followers with a substantially identical instantaneous exit and entry velocity at the ends of the linear runs for all positions of a pallet whereby the pallets may be maintained taut without variation in effective span as individual pallets enter and leave the linear runs.

9. A sprocket-less, endless, precision transfer system including a drive means for contacting successive elements thereof, comprising a plurality of load-bearing pallets pivoted together adjacent their ends upon parallel axes, a load-supporting track follower on each pallet and secured thereto on an axis parallel to and co-planar with the first pivot axes and midway therebetween, a track for said track followers having linear runs along which the pallets are guided for movement in opposite directions and a stationary curved track section between adjacent ends of the linear track runs for guiding the pallets, the section being curved in a path to effect substantially equal and opposite linear displacements of the pivots of said pallets along the respective straight track runs, and means for holding the pallets parallel and preventing outward displacement thereof away from the track before they leave the ends of the linear runs, whereby the pallets may be maintained taut without variation in effective span as individual pallets enter and leave the linear runs.

10. A sprocket-less, endless, precision transfer system including a drive means for contacting successive elements thereof, comprising a plurality of pallets pivoted together adjacent their ends upon parallel axes, a load-supporting track follower on each pallet and secured thereto on an axis parallel to and co-planar with the first pivot axes and midway therebetween, a track for said track followers having linear runs along which the pallets are guided for movement in opposite directions and a stationary curved track section between adjacent ends of the linear track runs for guiding the pallets, the section being curved in the form of a half circle of a diameter equal to one pallet pitch to effect substantially equal and opposite linear displacements of the pivots of said pallets along the respective straight track runs, and means for holding the pallets parallel and preventing outward displacement thereof away from the track before they leave the ends of the linear runs, whereby the pallets may be maintained taut without variation in effective span as individual pallets enter and leave the linear runs.

11. A sprocket-less, endless, precision transfer system including a drive means for contacting successive elements thereof, comprising a plurality of pallets pivoted together adjacent their ends upon parallel axes, a load-supporting track follower on each pallet and secured thereto on an axis parallel to and co-planar with the first pivot axes and midway therebetween, a supplementary track follower on each pallet pivot in the same plane as the load-supporting followers, a track for said track followers having linear runs along which the pallets are guided for movement in opposite directions and a stationary curved track section between adjacent ends of the linear track runs for guiding the pallets, the section being curved in a path to effect substantially equal and opposite linear displacements of the pivots of said pallets along the respective straight track runs, said section providing one curved path for the load-supporting track followers and providing clearance for the supplementary track followers to swing outwardly of said path, and means for holding the pallets parallel and preventing outward displacement thereof away from the track before they leave the ends of the linear runs whereby the pallet may be maintained taut without variation in effective span as individual pallets enter and leave the linear runs.

12. A sprocket-less, endless, precision transfer system comprising elongated pallets pivoted together and having two track followers secured to each pallet, one at an end and the other midway of the length of a pallet, means forming the sole guide and support for the pallets consisting of two straight parallel track runs for outgoing and returning pallets respectively and two curved turn-around tracks at least one of which is semi-circular, said pallets being guided by both track followers along the straight track runs and by only the middle track followers along the turn-around track, the end track followers having a different path of travel outside the path of the middle track followers at the turn-around tracks.

13. A sprocket-less, endless, precision transfer system comprising elongated pallets pivoted together and each having a track follower upon which the pallet may both translate along and pivot, a track forming the sole guiding and supporting means for the pallets comprising parallel elongated straight runs joined by stationary turn-around sections at each end, one of which comprises a half circle joining the straight runs, said track follower being located midway between the pallet pivots and constituting the sole guide for the pallets from the circular track section.

14. A self-linked pallet transfer system comprising a plurality of elongated pallets pivoted together to form a chain, a pair of spaced rotatable track followers arranged at the pivots between adjacent pallets, a first double track run along which the pallets advance, a second double track run along which the pallets return, and a stationary, double turn-around track at each end of said runs and curved to effect transfer of each pallet out of one run and into the other with equal instantaneous velocities whereby the chain may be maintained tautly in engagement with the track throughout its length, said turn-around tracks constituting the sole guide of the pallets intermediate the advancing and returning track runs.

15. A self-linked pallet transfer system comprising a plurality of elongated pallets pivoted together to form a chain, a pair of spaced rotatable track followers arranged at the pivots between adjacent pallets, a second pair of rotatable track followers arranged midway between the first set, a first double track run for said followers along which the pallets advance, a second double track run for said followers along which the pallets return, and a stationary, double turn-around track at each end of said runs and curved to effect transfer of each pallet out of one run and into the other with equal instantaneous velocities whereby the chain may be maintained tautly in engagement with the track throughout its length, said turn-around tracks constituting the sole guide of the pallets intermediate the advancing and returning track runs.

References Cited in the file of this patent

UNITED STATES PATENTS

| | | |
|---|---|---|
| 588,459 | Mayo | Aug. 17, 1897 |
| 601,578 | Marsh et al. | Mar. 29, 1898 |
| 722,689 | Frink et al. | Mar. 17, 1903 |
| 1,472,049 | Clark | Oct. 30, 1923 |
| 1,632,569 | Taylor | June 14, 1927 |
| 1,718,512 | Wright et al. | June 25, 1929 |
| 1,768,534 | Aiken | June 1, 1930 |
| 1,773,525 | Draper | Aug. 17, 1930 |
| 2,752,883 | Curtis | July 3, 1956 |